United States Patent [19]

Sperberg

[11] 3,847,012
[45] Nov. 12, 1974

[54] METHOD OF CONTROLLING AND MEASURING TIRE FORCES

[76] Inventor: Lawrence R. Sperberg, 6740 Fiesta Dr., El Paso, Tex. 79912

[22] Filed: Nov. 23, 1971

[21] Appl. No.: 201,587

Related U.S. Application Data

[63] Continuation of Ser. No. 15,509, March 2, 1970, abandoned.

[52] U.S. Cl. .................................. 73/8, 73/146
[51] Int. Cl. .................................. G01m 17/02
[58] Field of Search ...................... 73/146, 8, 137

[56] References Cited
UNITED STATES PATENTS

| | | | |
|---|---|---|---|
| 1,490,899 | 4/1924 | Scott | 73/8 |
| 1,902,307 | 3/1933 | Larkin | 73/8 |
| 2,464,708 | 3/1949 | Moseley | 73/137 |

*Primary Examiner*—Donald O. Woodiel
*Attorney, Agent, or Firm*—Marcus L. Bates

[57] ABSTRACT

A method of measuring the energy transmitted between the tread surface of a rotating tire and a moving surface which supports the tire. The power output of the prime mover which rotates the tire may be determined from the measured revolutions per minute (rpm) and manifold pressure (M.P.) or from the fuel flow of an internal combustion engine. This power output is correlated with the actual torque or force exerted by the tire tread surface against a moving surface whereupon the effects of the drive-train, differential, wheel bearings, and tire flexing losses are eliminated from the observed indicated power output of the engine. The correlation is attained by placing the vehicle upon a force measuring device which has previously been calibrated to measure power expanded upon the device in any suitable power unit, such as horsepower. A dictionary of stored data relating engine performance, such as the observed rpm and manifold pressure, with the actual torque or power exerted by the surface of the tire is provided whereby test data in the form of power output may be subsequently obtained which directly relates the force exerted by the tread surface of the tire to the indicated power delivered by the engine in propelling a vehicle down a highway.

This expedient therefore changes the vehicle into a mobile dynamometer, since the dictionary of stored terms can be compared to the indicated engine power output under any operating conditions to enable rapid determination of the actual torque or developed hp which is extended in overcoming the various forces which resist movement of the vehicle.

12 Claims, 9 Drawing Figures

METHOD OF CONTROLLING AND MEASURING TIRE FORCES

CROSS-REFERENCES TO RELATED APPLICATIONS

This is a continuation of application Ser. No. 15,509, filed 3-2-1970, now abandoned.

My copending Patent application Ser. No. 695,952 filed concurrently herewith.

BACKGROUND OF THE INVENTION

In testing tires, especially pneumatic tires, wherein the test is conducted over a specific route, it is usually difficult to exactly correlate the data from one test with the data from another for the reason that the test vehicle under the first condition may have been driven substantially differently with respect to the second test vehicle. Therefore, should identical tires be provided on two different test vehicles, a comparison of the test results of the first vehicle with respect to the test results of the second vehicle will not always yield identical results. This is especially so where different vehicles have been used in the different tests and even when different vehicles are used in the same test.

Tires and their useful lives in one of two ways. Either they wear out or they fail. If they fail, the cause is due to only two reasons. Either fail due to accidental injury or they fail due to structural deterioration within the tire body. If the failure is due to structural deterioration, the deterioration is due to oxidation, fatigue, or the limit of endurable stress upon some element of the tire having been exceeded.

If a tire wears out, or fails due to oxidation deterioration, fatigue deterioration or because the limit of endurable stress has been exceeded at some point within the tire, the termination of the tire's life is associated with the amount of work which it has been required to perform.

Work in the engineering sense is defined as a force acting through a distance. Thus, any agent does work on a body when it exerts a force on the body acting through a distance along the direction of the force. The time rate of doing work is called power. The common engineering expression of denoting power is the expression "horsepower." Horsepower as used herein is the rate at which work is performed and is defined as the power delivered by an agent doing work at the rate of 33,000 ft. lb. per minute. The total amount of work performed is a time rate function and in this application is the horsepower-hour. A horsepower-hour is the amount of work performed when power is expended at the rate of 1 horsepower over a period of 1 hour.

When a tire which is mounted on a vehicle performs work, the tire exerts a force upon the vehicle and this force moves the vehicle through a measurable distance. The force which the tire exerts upon the vehicle is a measure of the torque existent at the contact footprint of the tire which respect to the ground supporting surface. The torque exerted at the tire tread-road surface inter-face is related to the horsepower or work performed by the expression: Horsepower $= 2\pi NT$, where $\pi$ is the constant 3.1416, N is the rotation of the tire in revolutions per minute, and T is the torque expressed in ft. lbs.

The major amount of power which is transmitted through a tire to the ground may be received as forward or backward forces. The source of these forces, imparted to the tire either forward or backward, originates from either the engine or the brake system of the vehicle. In a bias constructed tire, torque is exerted upon the cord structure and is manifested as an extension force which starts at the anchor point of the cord at the bead and is transmitted along the cord to another anchor point which is located where the tread contacts the road surface. An energy which is not delivered at the area where the tread contacts the road surface must be transmitted along the trailing portion of the cord toward the remaining end of the cord which is anchored to the opposite bead. This undelivered energy is dissipated as an undesirable vibration or in increasing the kinetic energy. The transmitted energy delivered at the contact surface between the tread and the road surface is used in propelling the vehicle forward, or in stopping the vehicle.

In either a belted radial or belted bias constructed tire, the transmitted power may be traced as a torque force which is first transmitted through the body cords starting at the anchoring point of the cord to the tire bead. At the juncture where the body cords mate or join with the belt or girdle, the force must be transmitted through the rubber interface located between the belt and body cords and into the cords of the belt and thence to the road surface where it propels the vehicle forward. The transfer of work energy through the rubber cord interfaces places great shear stress upon these interfaces in the form of a torque force.

Thus, the flow of energy required to propel a vehicle forward originates at the prime mover; flows through the tire body, principally the cord structure; and is ultimately delivered at the tire tread-road surface. The energy flow may accordingly be traced through the tire from the anchor points of the cord around the bead, along the cord, and through the anchored portion of the tire tread which rests upon the ground supporting surface.

Therefore, in order to determine the capabilities of a tire with respect to its ability to perform work, and the capabilities of the cord within the tire body to withstand the cyclic application of force, and in order to relate this word performance and power flow to the manner in which a tire wears and fails, it is necessary to provide a simple and effective means for measuring the instantaneous horsepower or torque which is exerted at the constact area where the tire tread forms a footprint upon the ground supporting surface. This may be accomplished by determining the rate at which work is performed by a pneumatic tire in propelling a vehicle forward and to equate this work with some other measurable quantity which is directly proportional to the work, all of which should be accomplished quickly, accurately, and simply.

According to the law of conservation of energy, the heat produced is the equivalent of the work expended, or in the case of a heat engine, the work obtained is the equivalent of the heat that disappears from the energy balance. The heat may be measured by any convenient unit, such as the BTU, and the work by another unit, such as the foot pound. The precise relationship between these units is 1 BTU = 777.64 foot pounds, which is also the mechanical equivalent of heat.

An internal combustion engine is a heat engine, since it converts heat energy into mechanical energy. The heat energy is obtained by burning fuel. Since fuel used in any internal combustion engine has a heat energy equivalent measured as BTU units, it is obvious that correlation can be achieved between the fuel flow rates and the resultant power transmitted as torque exerted at the tire tread-ground interface.

As stated above, the major portion of work which a tire performs is used in overcoming forward or backward forces; however, the influence of transverse and vertical forces upon the power flow through a tire must not be overlooked.

Vertical forces in a pneumatic tire are primarily induced by the applied load and the inflation pressure, although rod surface irregulaties and the aerodynamic characteristics of the vehicle also influence the magnitude of the vertical forces. Vertical forces are expended primarily in bending a tire.

Transverse forces in a pneumatic tire result from a change in direction of a vehicle from one line of travel to another These forces are induced into the vehicle by steering and by cross winds.

In normal vehicle operation the general relationship existent between forward, transverse, and vertical forces is roughly of the ratio of 80 - 10 - 10.

SUMMARY

Since tire failure is a result of a quantitative amount of work performed during the useful life thereof, and since any tire is capable of providing a finite amount of useful work during its life, it is therefore reasonable and desirable to measure the amount of work associated with the tire, and to be able to compare this work to the measured number of miles driven while abrading away a certain amount of tread wearing compound, or in meeting its ultimate failure.

It is therefore a primary object of this invention to provide a method of measuring the actual forces exerted by the tread surface of a tire against a surface which moves relative to the tire.

Another object of this invention is to provide a method by which a predetermined amount of force can be imparted to a tire as measured between the tread surface of a pneumatic tire and a surface which moves relative to the tire.

A still further object of this invention is the provision of a method of ascertaining the accumulated forces exerted by a tread surface of a pneumatic tire against a moving road surface over any desired distance.

A still further object of this invention is the provision of a method of testing tires wherein the forces encountered by the tire over a specific test route where vehicle pneumatic tires are being tested can be determined with exactness.

Another object of the invention is to furnish a quick, simple means whereby power losses associated with particular tire constructions and designs can be readily determined.

The above objects are attained in accordance with the present invention by measuring the indicated velocity of a vehicle and the manifold pressure of the prime mover of the vehicle while travelling at different simulated conditions of a moving vehicle; the work measured at the surface of the tires provides a dictionary of stored terms which later enables the work transmitted through the tread surface of the tire at any condition of speed and resisting force to be readily ascertained.

DESCRIPTION OF THE PREFERRED EMBODIMENT

Figure 1:
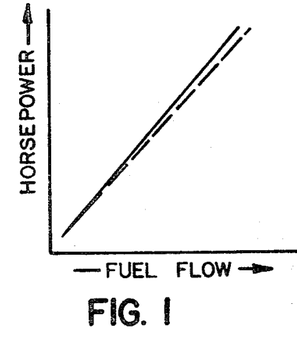
FIG. 1 is a plot generally showing the relationship between the fuel flow and horsepower delivered by an internal combustion engine.
Figure 2:
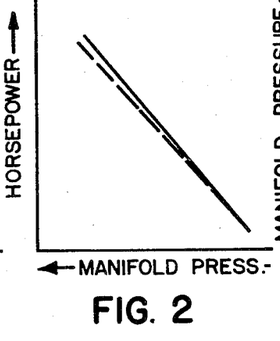
FIG. 2 is a plot generally showing the relationship between horsepower and manifold pressure of an internal combustion engine.
Figure 3:
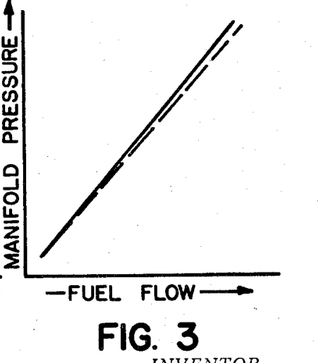
FIG. 3 is a plot generally showing the relationship between the manifold pressure and fuel flow of an internal combustion engine.

FIGS. 1 through 3 show the various relationships between fuel flow, horsepower, and manifold pressure, under a high condition of resisting force (solid line) and a moderate condition of resisting force (dash-dot line). The purpose of these figures is to establish some of the terminology and concepts necessary for an understanding of the present invention, as will be pointed out in greater detail later on.

In particular, FIG. 1 shows that the horsepower delivered by an internal combustion engine is directly proportional to the fuel consumed by the engine. The two diverging curves illustrate differences in severity of operation with the solid line indicating a greater severity as compared to the dash-dot line.

FIG. 2 shows that the delivered horsepower of an internal combustion engine is directly proportional to the intake manifold pressure, with increased horsepower requiring a reduction in the manifold pressure. The solid and dashed lines indicate the same conditions set forth as discussed in conjunction with FIG. 1.

FIG. 3 shows that the fuel consumed by an internal combustion engine is proportional to the manifold pressure of the engine, with the rate at which the fuel is consumed increasing as the intake manifold pressure increases.

Figure 4:
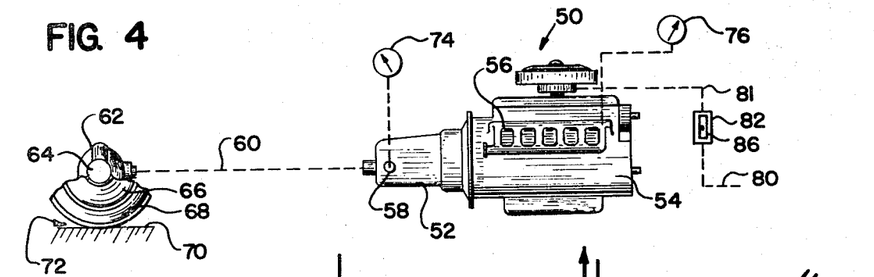
FIG. 4 is a schematical representation of a portion of a vehicle, illustrating the power plant and its relationship to a rear wheel thereof which is travelling upon a road surface.

Looking now to the detail of FIG. 4 there is seen indicated by the arrow at numeral 50 a portion of a conventional vehicle which includes a vehicle power plant having a transmission 52, an engine block 54, and an intake manifold 56. A speedometer drive chain fitting is seen at 58. The transmission is connected to the usual drive line 60, which in turn is connected to a differential 62. The differential drives an axle 64 upon which there is rotatably mounted a conventional wheel 66 having a tire 68 mounted thereon in order to suitably suspend the vehicle from a road surface 70. The tire 68 is the same tire seen at 14 of FIG. 5. The arrow at numeral 72 generally indicates the supporting interface or contact area between the surface of the tire tread and the supporting surface.

Numerals 80 and 81 are the fuel flow conduits which supply the internal combustion engine with combustible fuel. Numeral 82 is a fuel flow indicator, having indicia at 86 which enables the quantity of fuel flowing therethrough to be readily observed in any convenient units, such as pounds/minute. It should be understood that the fuel flow indicator merely illustrates one form of a fuel flow metering system which may be used in lieu of or in conjunction with the manifold pressure and velocity measuring means (74 and 76) in order to determine the power delivered by the engine to the tire tread surface.

Figure 5:
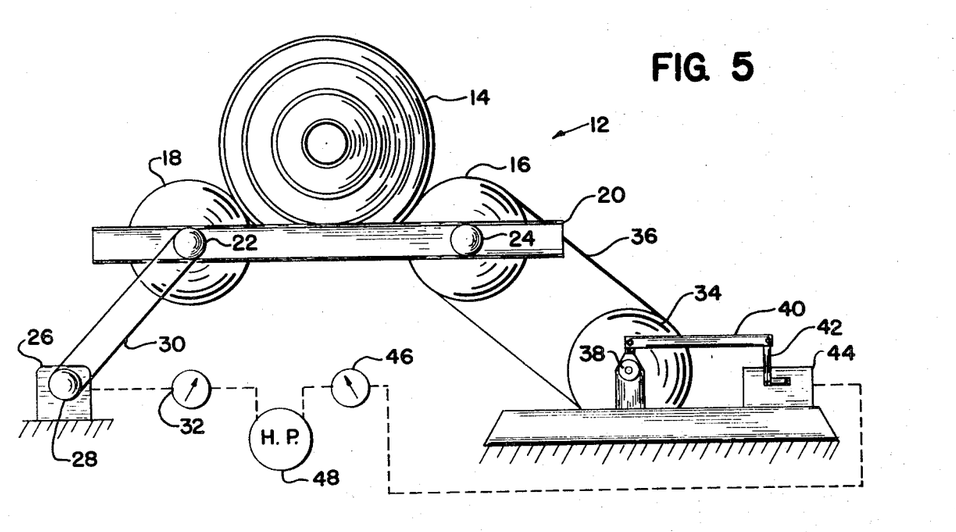
FIG. 5 is a more or less schematical side view of a force measuring apparatus showing a pneumatic tire which supports a vehicle operatively positioned thereon.

Looking now to the details of FIG. 5 of the drawings, wherein the numeral 12 generally illustrates a schematical side view of a standard pneumatic tire 14 which is the same tire seen at 68 of FIG. 4 and which is mounted upon the rear suspension system (not shown) of a vehicle. The tire 14 rests against a dynamometer drive wheel 16 and an idler wheel 18, with the tire 14 being adjusted with respect to the wheels in a manner to closely simulate the same conditions as if the tire 14 were travelling down a road while supporting the vehicle in a conventional manner. The wheels 16 and 18 are supported from a main frame 20 by the illustrated journaled shaft ends 22 and 24. A tachometer 26 includes a pulley 28 which is belt driven by the shaft end 22, as generally indicated by numeral 30. The tachometer is operatively connected to an indicator 32 to thereby enable one to determine the rotational velocity of the wheel 18.

A turbine 34, which may be any variable force or torque producing means, is suitably driven by a chain or belt drive 36, although the turbine can be directly coupled to the shaft end 24 if desired. The turbine is journaled at 38 and allowed to rotate a limited distance or amount by the illustrated bell crank which is attached to lever 40. Linkage 42 completes the connection of the torque measuring apparatus 44 to the journaled end of the wheel. The torque indicator 46 measures the amount of torque exerted by the turbine 34 in resisting the rotation of tire 14.

Since tachometer 32 is directly related to the turbine speed, and since the torque indicator 46 is directly related to the force or torque exerted by the turbine 34, these two variables may be integrated at 48 to provide a means by which the horsepower transmitted by the tire surface 14 in rotating the wheels 16 and 18 can be measured, since horsepower is simply a quantitative measure of force or torque exerted over a period of time. (One horsepower equals 550 ft. lbs./sec.)

Figure 6:
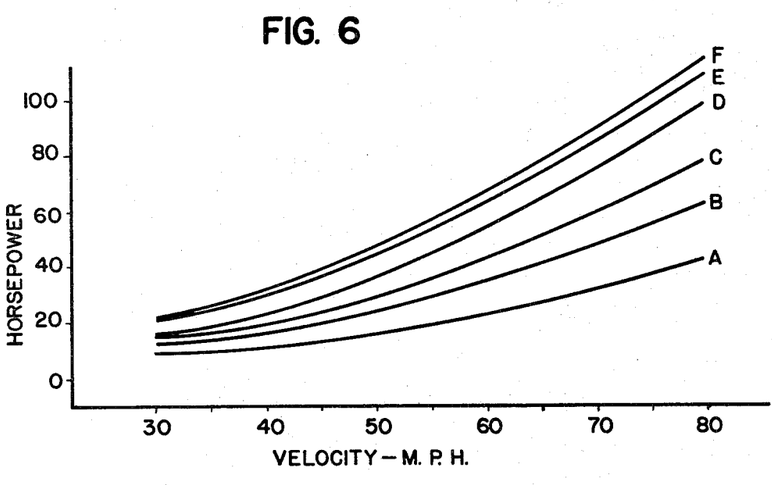
FIG. 6 is a plot of delivered horsepower vs relative vehicle velocity as measured on the dynamometer of FIG. 5 while utilizing the vehicle of FIG. 4 which is operating against various applied resisting forces imparted to the dynamometer.

Looking now to FIG. 6 wherein there is seen a plot of horsepower vs vehicle velocity (mph) for six different conditions of resisting force A, B, C, D, E, and F as obtained in operating a vehicle, such as is schematically represented by FIG. 4, under varying conditions of resisting force and speed, with the vehicle being operatively positioned upon the hydraulic dynamometer in the manner illustrated in FIG. 5. Curves A through F are the various resisting forces which are attained by adjusting the operation of turbine 34 in a manner to impart increasing resisting forces to the wheel 16 to thereby cause the vehicle tire tread surface to apply or exert increasing amounts of torque in order to rotate the wheel against the resisting force induced by turbine 34. Curves A through F of FIG. 6 correspond to Curves A through F of the remaining figures. The horsepower may be directly read at 48 from the dynamometer while the vehicle velocity is simultaneously recorded at 32 or from the vehicle itself. Hence it may be seen that at 60 mph under a resisting force A, the power plant 54 of the vehicle must deliver 17 horsepower, for example.

Figure 7:
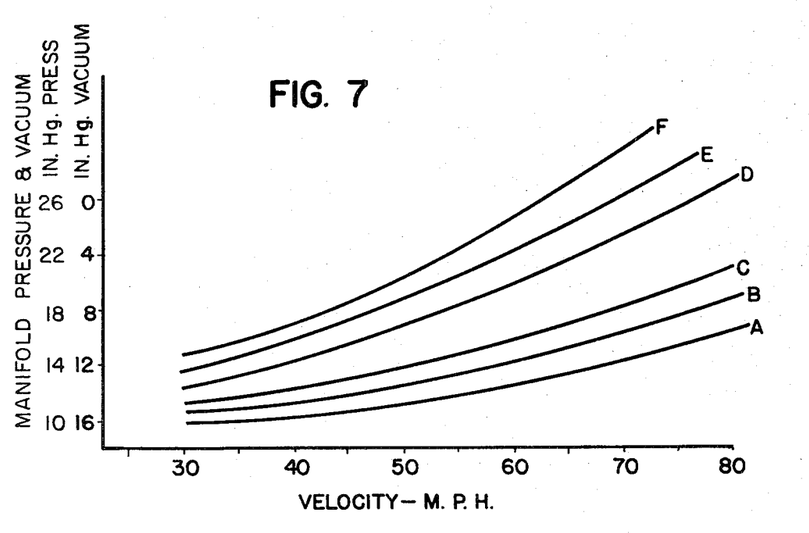
FIG. 7 is a plot of the observed engine manifold pressure vs relative vehicle velocity as measured on the hydraulic dynamometer of FIG. 5 while utilizing the vehicle of FIG. 4, with the tire tread surface of the vehicle operating against various applied resisting forces which are imparted to the dynamometer.

Looking now to the details of FIG. 7 wherein the manifold pressure is plotted against the velocity of the vehicle (mph), the various curves A, B, C, D, E, and F represent the power which must be developed by the engine in order to overcome the beforementioned six different conditions of applied resistance or drag which are imposed upon the vehicle by the wheel 16 of FIG. 5. The six illustrated conditions of resisting force are identical to Curves A – F of FIG. 6, and while six curves are illustrated for purpose of discussion it should be understood that an indefinite number of curves could be present, of which only six are shown. Therefore, Curve A of FIGS. 6 and 7, represents the minimum resisting force which is applied by the dynamometer wheel 16 in resisting rotation imparted thereto by the tire tread surface 14.

As further seen in the illustration of FIG. 7, as vehicle velocity increases, the developed power of the prime mover, or power plant, must increase proportionately, and accordingly the measured intake manifold pressure progressively increases as the speed of the vehicle increases. For example, at 60 mph under the resisting force characterized by Curve A, a manifold pressure of 13 inches is required to maintain this particular application of power. Curve B represents an increased resisting force applied by turbine 34 in resisting rotational motion imparted thereto by the vehicle tire 14. Curves C through F represent still further increases in the resisting forces of the turbine. It should be understood that the manifold pressure is read directly from the vehicle while the velocity is read from either the dynamometer at 32 or from the vehicle speedometer, assuming both to be correctly calibrated. It should be further understood that curves 6 and 7 were plotted simultaneously while recording data from the dynamometer of FIG. 5 and from the vehicle manifold pressure gauge at 76 so as to exactly characterize the two curves with the imposed resisting force.

Figure 8:
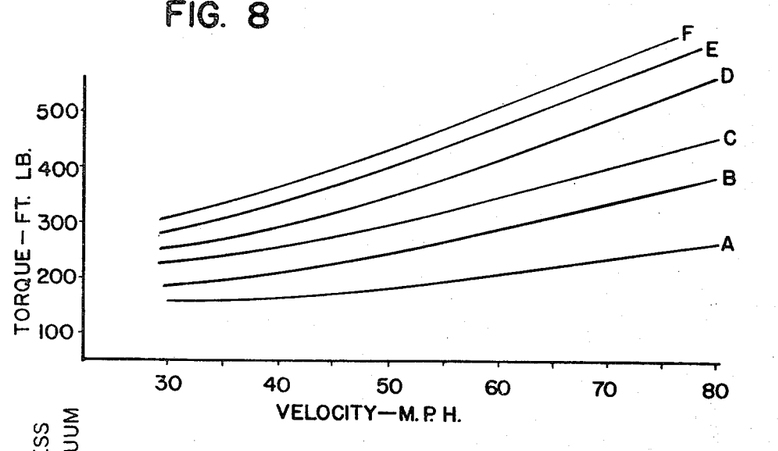
FIG. 8 is a plot showing the relationship between the torque delivered by the engine and vehicle velocity for the specific vehicle of FIG. 4 as determined in conjunction with the dynamometer of FIG. 5 in accordance with one of the teachings of the present invention.

Looking now to the details of FIG. 8, wherein the torque is plotted against the velocity of the vehicle with the beforementioned Curves A through F representing the various resisting forces which have been applied in resisting the force of torque exerted by the rotating tire 14 against the wheel 16 of the dynamometer. Curves A through F of FIG. 8 correspond to Curves A through F of FIGS. 6 and 7 in order to enable the velocity, horsepower, torque, and the manifold pressure of the various curves to be related to each other. The curve of FIG. 8 enables a rapid evaluation of the torque exerted by the tread surface of the tire to be attained. This curve is plotted by merely calculating the resisting forces at a specific velocity of the vehicle and the rotational speed of the tire in terms of ft. lbs. rather than horsepower through use of the equation hp = 2 π NT.

Figure 9:
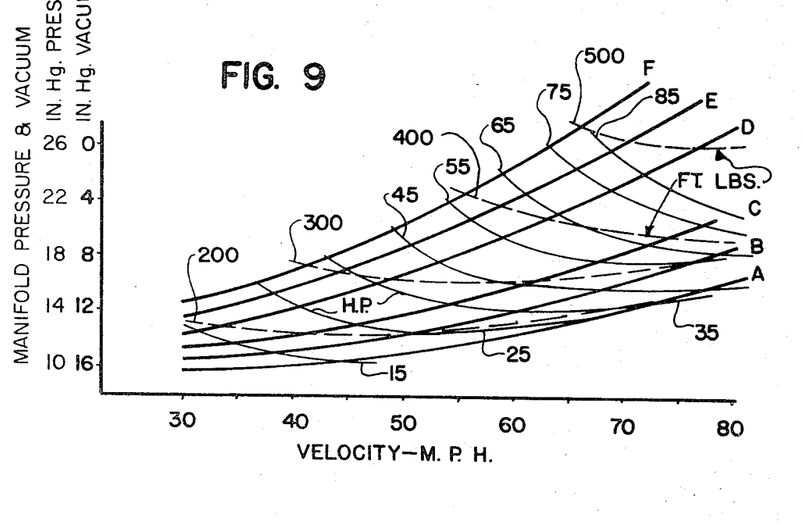
FIG. 9 is a plot showing the relationship between vehicle engine manifold pressure, vehicle speed, and the torque exerted at the tire tread surface as well as the constant horsepower curves as measured upon the dynamometer of FIG. 5, with the data being taken while various resisting forces A – F are imparted to the rear wheels by the dynamometer.

FIG. 9 shows the same plot as illustrated in FIG. 7, with constant torque and horsepower lines from the foregoing figures being added thereto. The torque lines are expressed in foot/pounds, and shown as a series of dash-dot lines which intersect both the lines of resisting force A – F and the constant horsepower curves 15 – 85. The four torque lines indicate the torque exerted by the tire tread surface for any combination of speed, manifold pressure, and resisting force to be ascertained for the particular size tire being investigated. Similarly, the horsepower lines or curves enable the horsepower expended at the tread surface to be ascertained for any combination of speed, manifold pressure, and resisting force.

engine block, and as a frictional losses represents a constant loss of energy. When this loss is subtracted from the total available power based on the air and fuel flow, the result is a finite amount of energy which has been converted into useful energy or work. Accordingly, fuel flow is a measure of developed horsepower, as generally set forth in FIG. 1, wherein the curve denoted by the heavy line represents the available power when the vehicle is moved along the road under a moderate to severe resisting force as contrasted to the curve denoted by the dashed-dot line which represents the available horsepower delivered by the engine when the vehicle is moved along the road while under a light resisting force.

Horsepower can also be plotted as a function of manifold pressure for a given condition of resisting forces applied to the vehicle, and, as illustrated in FIG. 2 of the drawings, the manifold pressure increases as the horsepower increases, for the reason that manifold pressure is a measure of mass flow through the carburetor of air and fuel intake system of an internal combustion engine.

TABLE I

| WEIGHT | INFL PSI | % GRADE | SIMULATED WIND DRAG (1) | SPEED — MILES PER HOUR | | | | | |
|---|---|---|---|---|---|---|---|---|---|
| | | | | 40 | 50 | 60 | 70 | 80 | 90 |
| | | | HORSEPOWER MEASURED AT DIFFERENT SPEEDS | | | | | | |
| 3150 | 28 | 0 | NO | 14 | 22 | 27 | 40 | 52 | 65 |
| 3150 | 17 | 0 | NO | 17 | 23 | 31 | 44 | — | — |
| 3150 | 28 | 0 | YES(1) | — | 35 | 51 | — | — | — |
| 4150 | 50 | 0 | NO | 17 | 24 | 30 | 39 | 51 | — |
| 4150 | 50 | 0 | NO(2) | — | — | 33 | 47 | 63 | — |
| 4150 | 28 | 0 | NO | 17+ | 25 | 31 | 42 | 55 | — |
| 4150 | 28 | 0 | YES(1) | 24+ | 33+ | 52 | 75 | — | — |
| 4150 | 28 | 3% | NO | 30 | 41+ | 52+ | 67 | 84 | — |
| 4150 | 28 | 5% | NO | 35 | 47 | 59+ | 74 | 90 | — |

TABLE II

| TORQUE IN FT. LBS. CALCULATED AT DIFFERENT SPEEDS | | | | | | | | | |
|---|---|---|---|---|---|---|---|---|---|
| 3150 | 28 | 0 | NO | 141 | 176 | 181 | 230 | 261 | 291 |
| 3150 | 17 | 0 | NO | 171 | 184 | 208 | 253 | — | — |
| 3150 | 28 | 0 | YES(1) | — | 280 | 342 | — | — | — |
| 4150 | 50 | 0 | NO | 171 | 192 | 201 | 224 | 256 | — |
| 4150 | 50 | 0 | NO(2) | — | — | 221 | 270 | 316 | — |
| 4150 | 28 | 0 | NO | 176 | 200 | 208 | 241 | 276 | — |
| 4150 | 28 | 0 | YES(1) | 246 | 266 | 348 | 432 | — | — |
| 4150 | 28 | 3% | NO | 302 | 332 | 352 | 386 | 422 | — |
| 4150 | 28 | 5% | NO | 352 | 375 | 399 | 425 | 452 | — |

(1) The simulated wind drag was applied by pulling a parachute.
(2) Moderately strong cross wind averaging 16–20 mph at a 40° angle to line of travel. All other tests determined at a quartering wind velocity of 6–10 mph. Wind velocity measured with a wind indicator.

OPERATION

As seen in FIG. 1, the horsepower delivered by an internal combustion engine is directly proportional to the fuel consumed or combusted within the engine cylinders. This relationship is true because the carburetor of an internal combustion engine maintains substantially a constant air to fuel ratio, with the air and fuel flow rate through the intake manifold being a function of engine intake manifold pressure and rpm. Therefore, the engine can be subjected to an energy balance wherein energy flows into the engine in the form of a mixture of oxygen and fuel which chemically react together, or combust, within each of the cylinder heads to provide a quantitative amount of energy, or heat of combustion. The heat losses, such as dissipated by the radiator, Accordingly, as the reciprocating pistons of the engine pumps combustible gases through each of the cylinders, a "suction" or pressure drop occurs within the intake manifold which varies from atmospheric pressure when the engine is at full power to a lower pressure or gate, manifold vacuum when the engine is idling. Therefore, at atmospheric manifold pressure, the engine receives a maximum amount of air and fuel, or energy, whereas at minimum manifold pressure the minimum mass flow rate of combustibles is available for conversion into energy within the combustion chamber.

As seen in FIG. 3, fuel flow and manifold pressure are related to each other for the reason that an internal combustion engine is similar in operation to an air pump, and therefore the pressure within the intake manifold is a measure of the rate of fluid flow as pointed out above. Since the fuel flow is comprised of a specific air-flow mixture as determined by the carburetor, the manifold pressure must also be a measure of the rate of fuel which is combusted within the internal combustion engine. This explanation does not take into consideration the effect which a supercharger, or air pump, may have upon the operation of an engine, although the use of a supercharger would not preclude the practice of the present invention for the reason that the fuel flow rate vs manifold pressure would merely change in magnitude with respect to each other.

Therefore, horsepower actually delivered by an internal combustion engine can be measured under any conditions of rmp and resisting force by either measuring the fuel flow or, alternatively, a combination of the engine rpm and manifold pressure. Advantage may be taken of this simple and inexpensive expedient in order to determine the amount of horsepower which is expended by the engine as torque, with the torque being measured at the interface between the pneumatic tire tread and the ground contacting surface with exactness. This determination is carried out by placing the vehicle of FIG. 4 upon the apparatus of FIG. 5 in order to obtain data which enables the curves of FIGS. 6, 7, and 8 to be constructed, from which are obtained the curves of FIG. 9, wherein the curve of FIG. 9 represents a dictionary of stored terms which can be consulted in order to determine the instantaneous torque developed or imparted to the supporting road surface by the vehicle rear tires by merely observing the power output of the engine in terms of fuel flow or manifold pressure and rpm. The construction of FIG. 9 is best accomplished in accordance with the following specific example which sets forth one method by which the present invention may be utilized in order to measure these forces:

The vehicle of FIG. 4 is preferably placed upon a hydraulic dynamometer (Clayton Dynamometer manufacted by Clayton Mfg., Co. of El Monte, Calif.) in the indicated manner of FIG. 5. The pneumatic tires, which are a part of the rear suspension system of the vehicle, are placed upon the dynamometer wheels 16 and 18 with the weight of the vehicle being adjusted whereby the pneumatic tires 14 of the rear suspension system of the vehicle are pressed onto the dynamometer wheels 16 and 18 with a sufficient weight to prevent slippage which causes the diameter between the dynamometer wheel surfaces 16 and 18 and the axis of the wheel carrying tire 14 to equal the diameter or measured distance between the road surface 70 and the wheel axis of the moving vehicle of FIG. 4.

The engine is next operated at varying indicated vehicle velocities (32 of FIG. 5 and 74 of FIG. 4) while recording the manifold pressures (76 of FIG. 4) and indicated horsepowers (48 of FIG. 5) to provide curve A of FIGS. 6 and 7 respectively, wherein the maximum resisting force of turbine 34 is imparted to wheel 16. Turbine 34 is then adjusted in a manner to require the surface of the pneumatic tire 14 or 68 to impart an increased force or torque upon wheel 16 in order to again enable rotation of wheel 18 over a range of speeds whereupon the manifold pressure and horsepower are recorded as curve B, with the horsepower being plotted in FIG. 6 and the manifold pressure in FIG. 7 for this second controlled turbine resisting force. This same step is again repeated until a plot showing a family of curves such as exemplified by resisting force curves A, B, C, D, E, and F are obtained for FIGS. 6 and 7, for an entire range of speeds at various magnitudes of applied resisting forces.

Upon FIGS. 6 and 7 having been completed in sufficient detail, the data of FIG. 6 is transferred and plotted as constant horsepower lines upon FIG. 7 to yield the horsepower curves of FIG. 9. FIG. 8 is assembled from FIG. 6 by merely dividing the observed horsepower by $2 \pi N$, in order to enable torque at 72 to be rapidly determined for any condition of velocity and resisting force.

By reference to the completed FIG. 9, it is now possible to observe the indicated manifold pressure expressed in any arbitrary calibrated unit along with the vehicle speed in order to determine the actual force in terms of either horsepower or torque which is expended through the tire tread-road interface under any combination of applied load, inflation pressure, grade and wind drag. While FIG. 6 is depicted in terms of horsepower, which is a work unit, it is emphasized that should it be desirable to investigate tire or vehicle performance in terms of absolute applied torque, which is a force unit, it is possible to do so by determining the horsepower curves in the manner described for FIG. 6, then to convert horsepower to torque by use of the relationship $hp = 2\pi NT$ where N is the number of rotations per minute of rotating wheel 14 of FIG. 5 (or 68 of FIG. 4). Recognition of this relationship permits both the torque and horsepower to be plotted on the same figure or family of curves showing the various resisting forces A–F, as exemplified by FIG. 8 and plotted as torque (200 ft. lbs. to 500 ft. lbs.) in FIG. 9.

It should be noted that the plot of FIG. 6 does not depict the actual horsepower produced by the engine, but instead represents the actual force exerted by the surface of the pneumatic tire against a supporting road surface in propelling the vehicle down the road, and accordingly, the forces associated with the transmission, drive line, differential, wheel bearings, as well as the flexing or heat losses of the pneumatic tire are eliminated from consideration in the plot of the figures. Accordingly, by continually measuring manifold pressure at 76 and velocity at 74, the plot of FIG. 9 may be assembled and used to determine the actual power exerted at the tread surface while the vehicle is being driven under any operating condition or over any test route. Furthermore, the data of FIG. 9 can be used to maintain a predetermined force upon a tire by merely choosing the velocity and manifold pressure combination required to maintain any desired constant power output at the tread surface.

Looking again in more specific detail now to FIG. 9, in conjunction with the remaining figures, and assuming the vehicle to be traveling at 50 mph at an indicated M.P. of 14, it will be seen from the hp curves that the tire tread surface will exert a force of 31 hp in moving the vehicle down the road. This required power imposes a force equal to 240 ft. lbs. at the point where the tire tread surface contacts or pushes against the road supporting surface. Should the 50 mph speed be maintained as the vehicle encounters other conditions of varying forces which are normally induced into a moving vehicle, the power requirements must also proportionately change in order to compensate for the effects of wind (parasitic drag) and grade conditions. For example, assume a mild road grade is encountered which changes the resisting force from curve C (50 mph · 14 M.P.) to curve D (50 M.P.) mph · 17 M.P.), it follows that the power plant must accordingly deliver sufficient power to impart 40 hp to the tire tread surface in order to force the vehicle to maintain the 50 mph velocity. The opposite, of course, is also true wherein the vehicle encounters conditions which change the resisting force from C to B, for example.

The importance of measuring the torque exerted by the tire tread surface, or tire footprint, will be better appreciated from studying Tables I and II in conjunction with FIG. 9. As seen in Table I, a reduction in inflation pressure from 28 psig to 17 psig causes the hp to change from 14 to 17 (or $\Delta hp = 3$) at 40 mph, as compared to $\Delta$ hp of 4 at 70 mph, for the same change. Yet an increase in gross weight of 1,000 lbs. at these same speeds requires a power increase of only 3 and 2 hp respectively. On the other hand, a 3 percent grade at 40 mph requires the tire tread surface to expend 13 additional hp (17 to 30 hp change) while the same 3 percent grade at 70 mph requires a 29 hp (55 to 84 hp) increase at the tread surface.

Change in parasitic drag also produces dramatic changes in the horsepower requirements of a moving vehicle. For example, at 40 mph the hp increases from 17 to 24 from merely deploying a 4 foot diameter drag parachute. At 70 mph, the hp increases from 42 to 75 when the parachute is deployed. Hence, it is apparent that the magnitude of the parasitic drag which is associated with a moving vehicle is important, and that it is desirable to be able to measure the torque exerted by the tire tread surface in order to determine the parasitic drag changes produced by variations in body styles of vehicles, or to use this expedient as a measure of controlling the amount of the drag. Measurement of torque in accordance with the present invention enables the tire tester or vehicle designer to recognize and study these variations in drag, and account for the various forces which have been imparted to various parts of the vehicle if desired.

Another common form of parastic drag which escapes the attention of many experimenters is the effective side force which is imposed by transverse winds. Side winds of 30 mph received at 40° to the direction of travel of the vehicle produce an increase in the power exerted at the tread surface of 3 hp at 60 mph, with the same wind effect increasing the additional power required to 12 hp at 80 mph. Side winds, therefore, produce a transverse force which must be overcome by the tire tread surface by "crabbing" the vehicle into the wind. This crabbing causes a wear pattern which is similar to the pattern resulting from excessive "toe in" or "toe out" of the front suspension system. Transverse forces are also encountered when the vehicle negotiates a curve, or travels along an excessively sloped road.

The effect of vertical forces upon a vehicle tire is set forth in the tables by measuring the tire forces at various vehicle gross weight, or inflation pressure, and has been mentioned above.

Since most professional tire testers have specific routes over which they drive test cars, it is therefore possible to determine the actual horsepower expended by a tread surface which moves against a road surface (72 of FIG. 4) for any condition of speed, gross vehicle weight, wind condition, and grade. In particular, by recording elasped time as a function of velocity and manifold pressure, the dictionary of stored terms, such as represented by the plot of FIG. 9 may be used to integrate the entire test route for a particular combination of speeds, and for the particular vehicle upon which the data of the dictionary of stored terms is based to thereby ascertain the total work performed upon a tire while wearing away a finite amount of tread wearing surface. This integration may be expressed in any convenient term, such as horsepower-hour miles, or foot pound hour miles.

Tire wear, or tire durability, when measured in terms of hp distance, and time which is required to abrade away a quantitative amount of the tread is a more meaningful concept than the heretofore used "distance" or "mileage" factor which is universally employed by the tire testing industry. A tire which has been driven 5,000 miles while absorbing a work unit of 1,000 hp, for example, will obviously show more deleterious effects from the test as compared to a tire driven the same mileage, but, subjected to a work unit of only 750 hp, for example. The work unit could also be expressed as any other factor, so long as power or torque, time, and distance are encompassed by the expression.

By utilizing the concepts of the present invention, it is possible for a new test to be conducted which duplicates the actual conditions of a previous test by merely adjusting the power level of the vehicle power plant to a value which imparts the same amount of power into the tire tread surface as was experienced during some previous test which is to be duplicated. This expedient enables differences in grade, wind effects, drivers, and vehicles to be substantially eliminated from consideration, or at least duplicated, whereby the test results are more meaningful than was heretofore possible.

The present invention is also useful for determining power consumption characteristics of different tires. When The Tire & Rim Association, Inc. recommended loads for different inflation pressures are consulted and the curve resulting from plotting inflation pressure versus change in allowable load as a function of inflation pressure is extrapolated to zero change in load, it is seen that the extrapolated curve intercepts the zero load change at about 88 psig inflation pressure. Thus at this point the ordinary pneumatic passenger tire becomes a relatively inelastic object and therefore loses its identity as a pneumatic air cushioned device. At this pressure, additional loads imposed upon the tire fail to deflect the tire further, and at normal loads the tire does not deflect at all. All tires appear to react in this manner when the inflation pressure exceeds an upper limit causing this phenomenon.

In order to determine power losses attributable to the tire body elements, such as flex losses resulting from the bending associated with the vertical deflection of the tire, it has been customary historically to measure the power input to the tire, from which is subtracted the power output. This determination has been both cumbersome and expensive.

The use of the present invention permits a quick, inexpensive determination of the power loss occurring within a tire. This is accomplished by exactly calibrating the prime mover which exerts or imparts rotational energy into the tire with a power measuring device which ascertains the power exerted at the tread surface, using for the calibration an inelastic tire body.

This is attained by lathing a passenger tire in order to remove the tread wearing compound down to the cord body in the crown by leaving the tread rubber compound in the tire shoulder thereby resulting in a flat profile which makes the tire resemble a box-like construction but which enables sufficient traction to be developed between the tread surface and the measuring device which may be a test wheel dynamometer or any other means of measuring tire forces. The tire is inflated to circa 88 psig, the prime mover calibrated against the measuring device at the desired speeds and resisting forces, after which a dictionary of stored terms comparable to FIG. 9 is prepared. The vehicle prime mover may then be run over a given test course using the identical lathed tires inflated to 88 psig in order to calibrate the test course for the specific resisting forces. The special latched calibration tires are then removed and replaced with other tires to be measured for their power loss. The calibrated vehicle prime mover is then run over the test course with the replacement tires. The difference in power measured with the inelastic highly inflated calibration tire and the replacement tire inflated at a lower pressure and having its normal tread represents the power energy which is expended in bending the tire.

An identical tire having its entire tread wearing compound lathed away can be measured for its power requirements to ascertain the energy losses due to the presence of the tread wearing compound.

The foregoing can be utilized in accordance with the teachings of the present invention in order to evaluate the power expended by the flexing action of the tire body elements by evaluating the tire under conditions of overinflation and normal inflation, in conjunction with a dynamometer or test by actually driving the calibrated vehicle of the present invention along a smooth surface, wherein the differences in power represent the power consumed in flexing the tire.

The present method is also adaptable to indoor test wheels, wherein the wheel is used to duplicate the test results obtained in conjunction with vehicle road tests. For example, a test wheel which has been provided with a controllable hydraulic turbine, similar to the hydraulic dynamometer of FIG. 5, which selectively imposes a torque on the rotating wheel may be programmed to impose identical torque forces at the tire tread-test wheel surface in accordance with the recorded resisting forces observed over the test route. Specifically, by continuously recording the M.P. and mph data as a function of time during a road test, and comparing the data to the dictionary of stored terms of FIG. 9, a program results which can be used in conjunction with the above indoor test wheel whereby the peripheral speed of the tire is control led by wheel 18 comparable to the steel wheel of an indoor tire test wheel apparatus and the required resisting force applied by turbine 34 of FIG. 5 is journaled directly to the shaft supporting the test tire impressed upon wheel 18 to thereby subject a tire to the identical torque conditions of any specific or hypothetical test route. This test method is of immense value in that it not only eliminates the hazard of actual test driving, but also provides a more accurate and economical test means wherein accuracy can be held to closer tolerance than actual road tests. This is an especially useful procedure for any indoor tire test evauluation since the conventional test evaluation conducted today is so designed to evaluate the effect of essentially vertical forces only upon tire durability whereas actual service conditions subject the same tire to essentially forward forces. The torque force existent at the footprint of the tire on the metal wheel in indoor wheel tests as currently conducted range from 10 to 30 lb. ft. for passenger and truck tires whereas outdoor service conditions result in torque values approaching and exceeding 500 lb. ft. Current and past practice for indoor testing of tires also exaggerates the vertical force component since this is the only force component available for ready adjustment, although a few indoor test wheels are equipped with means for subjecting a tire to transverse forces by canting the tire at an angle to wheel 18. Wheel 18 of conventional indoor test wheels is quite large equalling one three-hundredths of a mile or greater circumference and possesses a very high moment of inertia. The ability to duplicate precise torque and vertical forces existent in outdoor performance applications with indoor test wheel equipment is particularly advantageous in high speed test which are both hazardous and expensive.

While the present invention has been described as being directed to a method for testing tires and has been exemplified primarily by its association with a vehicle driven upon a roadway, it also extends to track tests and indoor test wheels, as well as extending to the testing or evauluation of vehicle components other than tires. Accordingly, while the above portion of the disclosure sets forth several specific examples by which the present method can be practised, it will occur to others skilled in the art to make certain modifications therein as well as to use the above novel concepts in other fields; therefore, the metes and bounds of the present method is set forth in the following claims.

I claim:

1. A method of measuring the work performed by a tire tread surface which is held against a moving surface while a portion of the tread compound is abraded away, comprising the steps of:
   1. measuring the work performed by the tread surface of the tire as a function of vehicle power plant power output as the power plant causes the tire to rotate against a moving surface which exerts a controlled resisting force against the tire;
   2. carrying out step (1) at various rotational velocities of the tire for each of a plurality of controlled resistive forces;
   3. recording the vehicle power plant outputs with the work performed against the moving surface at the various velocities and controlled resistive forces to thereby provide a dictionary of stored terms which relates the work performed at the tire tread surface to the vehicle power output;
   4. wearing away a portion of the tread surface by rotating the tire by means of said vehicle at a velocity corresponding to one of said various velocities and under a resistive force corresponding to one of said plurality of resistive forces, while recording the power plant output of the vehicle;
   5. to thereby determine the work performed by said portion of the tire tread surface during step (4).

2. Method of measuring the energy required to wear away an outer portion of a tire tread surface comprising:
   1. rotating the tire with a prime mover while the tire tread surface is held against a surface which moves relative to the tire;

2. exerting a controlled resisting force of different magnitudes into the beads of the tire while the tire is rotated at various rotational velocities;

3. measuring the energy required of the prime mover to carry out step (2);

4. recording the prime mover power outputs with the owrk performed against the moving surface at the various velocities and controlled resisting forces which relates the work performed at the tread surface to the prime mover power output;

5. wearing away an outer portion of a tire tread surface by rotating the tire by means of a prime mover at a velocity corresponding to one of said various velocities and under a resisting force corresponding to one of said controlled resisting force, while recording the power output of the prime mover;

6. to thereby determine the work performed by said outer portion of the tire tread during step (5).

3. The method of claim 2 wherein the prime mover of step (1) is provided by an internal combustion engine of a vehicle, while the controlled resisting forces of step (2) is provided by a chassis dynamometer which is connected to the driven tires of the vehicle.

4. The method of claim 2 wherein the moving surface of step (1) is provided by a conventional test wheel.

5. The method of claim 2 wherein the resisting force of step (2) includes a liquid powered turbine connected to the rotating tire.

6. The method of claim 2 wherein the tire of step (1) is essentially the same type of tire used in step (5).

7. The method of claim 2 wherein the condition of step (5) corresponds to a specific geographical test route negotiated by a vehicle under prescribed conditions.

8. Method of measuring the work required to wear away part of the tire tread of a tire comprising the steps of:

1. rotatably mounting a tire with the tread surface thereof being placed in rolling contact with a relative moving surface;

2. exerting a plurality of controlled resisting forces into the beads of the tire by connecting the tire to drive a variable torque producing apparatus;

3. measuring the work expended by the tread surface of the tire at different rotational velocities of the tire for each of a plurality of said controlled resisting forces to thereby provide a dictionary of stored terms which relates the work performed at the tire tread surface to the controlled resisting force of the variable torque producing apparatus;

4. wearing away an outer portion of the tread surface of a tire by rotatably mounting the last said tire with the tread surface thereof placed in rolling contact with a relative moving surface, and rotating the tire at one of said rotational velocities while one of said controlled resisting forces is exerted upon the tire beads;

5. comparing the rotational velocity and resisting force of step (4) to the dictionary of stored terms obtained in step (3) to determine the work required to wear away the outer portion of the tread surface of the tire of step (4).

9. The method of claim 8 wherein the moving surface of step (2) is provided by a steel wheel.

10. The method of claim 8 wherein the condition of step (4) corresponds to a specific geographical test route negotiated by a vehicle under prescribed conditions.

11. The method of claim 8 wherein the torque producing means of step (2) is a liquid powered turbine connected to the rotating tire.

12. The method of claim 8 wherein the torque producing means of step (2) is attained through an electric force linkage.

* * * * *